United States Patent
Choi et al.

(10) Patent No.: US 12,051,314 B2
(45) Date of Patent: Jul. 30, 2024

(54) GAS AND EARTHQUAKE DETECTOR, GAS AND EARTHQUAKE REMOTE MONITORING SYSTEM USING THE SAME AND METHOD THEREOF

(71) Applicant: NANOKEM CO., LTD., Gyeongsangbuk-do (KR)

(72) Inventors: Sung-Hwan Choi, Gyeongsangbuk-do (KR); Young-Hwan Choi, Yongsan-gu (KR); Sung-An Ha, Seoul (KR)

(73) Assignee: NANOKEM CO., LTD., Gyeongsangbuk-do (KR)

( * ) Notice: Subject to any disclaimer, the term of this patent is extended or adjusted under 35 U.S.C. 154(b) by 277 days.

(21) Appl. No.: 17/560,414

(22) Filed: Dec. 23, 2021

(65) Prior Publication Data
US 2022/0207982 A1     Jun. 30, 2022

(30) Foreign Application Priority Data
Dec. 30, 2020 (KR) .......................... 10-2020-0188235

(51) Int. Cl.
*G08B 21/12* (2006.01)
*G01M 3/04* (2006.01)
*G01V 1/01* (2024.01)
*G08B 21/10* (2006.01)

(52) U.S. Cl.
CPC .............. *G08B 21/12* (2013.01); *G01M 3/04* (2013.01); *G01V 1/01* (2024.01); *G08B 21/10* (2013.01)

(58) Field of Classification Search
CPC ......... G08B 21/12; G08B 21/10; G01M 3/04; G01V 1/008

USPC ......................................................... 340/632
See application file for complete search history.

(56) References Cited

U.S. PATENT DOCUMENTS

| | | | | |
|---|---|---|---|---|
| 6,085,772 A | * | 7/2000 | McGill | F16K 17/366 137/553 |
| 2012/0092960 A1 | * | 4/2012 | Gaston | G01V 1/226 367/35 |
| 2022/0276400 A1 | * | 9/2022 | Kuwamori | G01V 1/137 |

FOREIGN PATENT DOCUMENTS

| CN | 204740714 U | 11/2015 |
|---|---|---|
| CN | 105303780 A | 2/2016 |
| CN | 205140166 U | 4/2016 |
| CN | 108431518 A | 8/2018 |

(Continued)

OTHER PUBLICATIONS

Office Action issued on Sep. 16, 2023 in connection with Chinese Application No. 202110829844.7.

*Primary Examiner* — Kam Wan Ma
(74) *Attorney, Agent, or Firm* — Gary J. Gershik (57) ABSTRACT

The present disclosure relates to a gas and earthquake detector, a gas and earthquake remote monitoring system using the same and a method thereof, and more particularly, to a gas and earthquake detector, a gas and earthquake remote monitoring system using the same and a method thereof, which detect a plurality of gases and earthquakes, detect and autonomously warn gas leakage of a plurality of detection target devices sensitive to the gas and the earthquake, and the earthquake around the detection target device, and easily register the gas leakage and the earthquake in a remote management means through a user mobile terminal of a user to monitor the gas leakage of the detection target device and the earthquake at a detection target device location through the remote management means.

11 Claims, 6 Drawing Sheets

(56) References Cited

FOREIGN PATENT DOCUMENTS

| KR | 100865869 | B1 | * | 10/2008 |
| KR | 10-1970149 | B1 | | 4/2019 |
| KR | 20190050066 | A | * | 5/2019 |
| KR | 10-2057319 | B1 | | 12/2019 |

* cited by examiner

GAS AND EARTHQUAKE DETECTOR, GAS AND EARTHQUAKE REMOTE MONITORING SYSTEM USING THE SAME AND METHOD THEREOF

CROSS-REFERENCE TO RELATED APPLICATIONS

This application claims benefit and priority to Korean Patent Application No. 10-2020-0188235, filed on Dec. 30, 2020, with the Korean Intellectual Property Office, the disclosure of which is incorporated herein in its entirety by reference.

TECHNICAL FIELD

The present disclosure relates to a gas and earthquake detector, a gas and earthquake remote monitoring system using the same and a method thereof, and more particularly, to a gas and earthquake detector, a gas and earthquake remote monitoring system using the same and a method thereof, which detect a plurality of gases and earthquakes, detect and autonomously warn gas leakage of a plurality of detection target devices sensitive to the gas and the earthquake, and the earthquake around the detection target device, and easily register the gas leakage and registering the earthquake in a remote management means through a user mobile terminal of a user to monitor the gas leakage of the detection target device and the earthquake at a detection target device location through the remote management means.

BACKGROUND

In recent years, there are a number of human casualties due to occurrence of a large-scale earthquake in many countries, including Korea, China, and Japan, and many buildings are collapsing.

In particular, in the Republic of Korea, there is a trend that medium to minor-earthquake regions or the number of earthquake occurrence times continuously increases in respect to occurrence of an earthquake and a 5.8-scale earthquake occurs in Gyeongju in 2016, and as a result, it is determined that the Republic of Korea is no longer a safe zone against the earthquake.

Damage at the time of the occurrence of the earthquake is divided into primary damage which occurs due to a primary earthquake and secondary damage such as leakage of gas, a short circuit, breakage of a water supply and drainage pipe, etc., due to the earthquake.

In particular, in the Republic of Korea, a heated floor system, called ondol culture utilizing a boiler is developed in Korea, and the boiler is installed every household.

Since the boiler uses a highly flammable substance such as oil and gas as fuel, there is a risk that human and property damage can be increased during leakage of the fuel due to the earthquake, etc.

Accordingly, there is a demand for a countermeasure against a secondary safety accident of the boiler due to the fuel leakage or overheat during occurrence of flow and vibration of the boiler due to a natural disaster such as the earthquake, etc.

As such a demand, it is configured in such a manner that a gas detector and an earthquake detector for detecting leaked gas are installed on a periphery on which the gas is used, such as the boiler, a gas range, etc., and the occurrence of the earthquake and the leakage of the gas are detected and the resulting alarm is generated, but there is a problem in that general persons cannot take an appropriate measure against the gas leakage and the earthquake due to a failure of an alarm device, an easy response to the alarm, etc.

Therefore, required is development of a remote monitoring system for gas leakage and occurrence of the earthquake, in which in addition to the detection of the gas leakage and the earthquake, the gas leakage can be quickly notified to a user regardless of a location of the user, and even though the user detects the gas leakage, a remote manager performing 24-hour monitoring can monitor the gas leakage in a house and the occurrence of the earthquake and notify the gas leakage and the occurrence of the earthquake to the user, and quickly cope with the gas leakage and the occurrence of the earthquake.

SUMMARY

Accordingly, the present disclosure has been made in an effort to provide a gas and earthquake detector, a gas and earthquake remote monitoring system using the same and a method thereof, which detect a plurality of gases and earthquakes, detect and autonomously warn gas leakage of a plurality of detection target devices sensitive to the gas and the earthquake, and the earthquake around the detection target device, and easily register the gas leakage and the earthquake in a remote management means through a user mobile terminal of a user to monitor the gas leakage of the detection target device and the earthquake at a detection target device location through the remote management means.

An exemplary embodiment of the present disclosure provides a gas and earthquake detector including: a detector communication unit connected to a wired/wireless data communication network by at least one of wired and wireless schemes to perform data communication with a detector management unit which is a gas leakage and earthquake monitoring system at a remote place, which is connected to the wired/wireless data communication network; a detection unit including at least one gas detection unit outputting gas measurement data according to gas concentrations for different types of gases exposed to the air and an earthquake detection unit detecting a vibration and outputting acceleration sampling data corresponding to an intensity of the detected vibration; an alarm generation unit generating an alarm; and a detector control unit setting an operation of at least one of at least one gas detection unit and the earthquake detection unit of the detection unit, determining whether gas is leaked and an earthquake occurs by receiving a gas concentration and a vibration intensity value by at least any set one of at least one gas detection unit and the earthquake detection unit, transmitting gas state monitoring information including the detected gas concentration and vibration intensity value to the detector management unit through the detector communication unit when the gas is not leaked and the earthquake does not occur, and transmitting accident occurrence prevention notification information to the detector management unit through the detector communication unit when any one of the gas leakage and the earthquake occurrence occurs.

The detector communication unit may include: a wireless communication unit including a long-range wireless communication unit wirelessly connected to the wired/wireless data communication network and performing wireless data communication with the wired/wireless data communication network and a short-range wireless communication unit performing direct short-range wireless communication with another device in a short range; and a wired communication unit wiredly connected to the wired/wireless data communication network to perform wired data communication with the wired/wireless data communication network.

The detector may further include: a sensor connection unit including a connection means in which the detection unit or the gas detection unit and the earthquake detection unit independently configured are physically detached, and when at least one of the detection unit, the gas detection unit, and the earthquake detection unit is connected, receiving detection type information corresponding to a detection type thereof from the connected detection means and outputting the received detection type information to the detector control unit, in which the detector control unit may include an operation setting unit performing the operation setting according to the detection type information input through the sensor connection unit.

The detector may further include: a detector storage unit storing detector identification information, in which the detector control unit may include a detector registration unit wirelessly connected to a user mobile terminal through the wireless communication unit and providing the detector identification information to the user mobile terminal and registering the detector identification information in the detector management unit through the user mobile terminal.

The detector may further include: a switch unit connected between a power supply unit of a detection target device in which the gas leakage is able to occur, which is influenced by the occurrence of the earthquake, or which generates the alarm, and an external power supply, and controlled to supply the external power to the power supply unit, but interrupt external power supplied to the power supply unit, in which the detector control unit may control the switch unit to interrupt the power of the detection target device when at least one of the least one gas and the earthquake occur.

Another exemplary embodiment of the present disclosure provides a method for controlling a gas and earthquake detector, which includes: a data acquiring process of acquiring, by a detector control unit, gas measurement data measured for at least one gas type through a gas detection unit of a detection unit and acquiring acceleration sampling data through an earthquake detection unit; an information providing process of generating gas state monitoring information including the measured gas measurement data and the acceleration sampling data, and transmitting the generated gas state monitoring information to a detector management unit through a communication unit; a gas leakage determining process of determining, by the detector controller, whether a gas concentration value (measurement value) for the acquired gas measurement data exceeds a reference value; an earthquake occurrence determining process of calculating, by the detector control unit, acceleration values for x, y and z axes from the acquired acceleration sampling data, and determining whether there is an acceleration value which exceeds the reference value among the calculated acceleration values for each axis; and an alarm generating process of determining that the gas is generated when at least one of the gas leakage and the earthquake occurrence is continued for a predetermined time or more, autonomously giving the alarm, and transmitting alarm notification information to the detector manager through the communication unit.

The method may further include an operation setting process of performing, by the detector control unit, operation setting according to detection type information input from a detection means of the detection unit through a sensor connection unit.

The detection type information may be at least one of carbon monoxide, liquid natural gas, and an earthquake.

The method may further include a detector registering process of transmitting, by the detector controller, detector registration information including detector identification information prestored through a paired user mobile terminal to the user mobile terminal so as to transmit the detector registration information to a detector management unit.

Still another exemplary embodiment of the present disclosure provides a gas and earthquake remote monitoring system using a gas and earthquake detector, which includes: a detector configured inside and outside a detection target device and measuring a gas for at least one type leaked to the inside and the outside of the detection target device, and a vibration, determining whether there is an alarm situation according to a gas concentration value and an intensity of the vibration, which are measured, generating and transmitting gas state monitoring information including gas measurement data for the measured gas concentration value and vibration measurement data for the vibration intensity value when there is no alarm situation, and generating an alarm, and then transmitting alarm notification information when there is the alarm situation; a user mobile terminal unit receiving detector identification information of the detector from the detector, and transmitting detector registration information including the detector identification information and user mobile terminal identification information thereof, and requesting registration, and alarming that abnormality occurs in at least one of the gas leakage from the detection target device and the earthquake occurrence around the detection target device by generating the alarm when receiving alarm notification information, to a user; and a detection management unit receiving detector registration information from the user mobile terminal through a wired/wireless data communication network, and storing the detector and user mobile terminal identification information of a user who uses the detector, and registering the detector, receiving gas state monitoring information from the detector through the wired/wireless data communication network and analyzing the received gas state monitoring information, and generating, and then, storing and managing analysis information, receiving the alarm notification information and notifying the received alarm notification information to a corresponding organization, and transmitting the alarm notification information to a corresponding user mobile terminal unit by the user mobile terminal identification information of the detector user.

The detector may include a detector communication unit connected to a wired/wireless data communication network by at least one of wired and wireless schemes to perform data communication with a detector management unit which is a gas leakage and earthquake monitoring system at a remote place, which is connected to the wired/wireless data communication network; a detection unit including at least one gas detection unit outputting gas measurement data according to gas concentrations for different types of gases exposed to the air and an earthquake detection unit detecting a vibration and outputting acceleration sampling data corresponding to an intensity of the detected vibration; an alarm generation unit generating an alarm; and a detector control unit setting an operation of at least one of at least one gas detection unit and the earthquake detection unit of the detection unit, determining whether gas is leaked and an earthquake occurs by receiving a gas concentration and a vibration intensity value by at least any set one of at least one gas detection unit and the earthquake detection unit, transmitting gas state monitoring information including the detected gas concentration and vibration intensity value to the detector management unit through the detector communication unit when the gas is not leaked and the earthquake does not occur, and transmitting accident occurrence prevention notification information to the detector management unit through the detector communication unit when any one of the gas leakage and the earthquake occurrence occurs.

The detector may further include: a sensor connection unit including a connection means in which the detection unit or the gas detection unit and the earthquake detection unit independently configured are physically detached, and when at least one of the detection unit, the gas detection unit, and the earthquake detection unit is connected, receiving detection type information corresponding to a detection type thereof from the connected detection means and outputting the received detection type information to the detector control unit, and the detector control unit includes an operation setting unit performing the operation setting according to the detection type information input through the sensor connection unit.

The detector may further include: a detector storage unit storing detector identification information, and the detector control unit may include a detector registration unit wirelessly connected to a user mobile terminal through the wireless communication unit and providing the detector identification information to the user mobile terminal and registering the detector identification information in the detector management unit through the user mobile terminal.

The detector may further include: a switch unit connected between a power supply unit of a detection target device in which the gas leakage is able to occur, which is influenced by the occurrence of the earthquake, or which generates the alarm, and an external power supply, and controlled to supply the external power to the power supply unit, but interrupt external power supplied to the power supply unit, in which the detector control unit may control the switch unit to interrupt the power of the detection target device when at least one of the least one gas and the earthquake occur.

Yet another exemplary embodiment of the present disclosure provides a gas and earthquake remote monitoring method using a gas and earthquake detector, which includes: a detector registering process of receiving, by a user mobile terminal unit, from a detector, detector identification information of the detector, and transmitting detector registration information including the detector identification information and user mobile terminal identification information thereof to a detector management unit to register the detector and a user mobile terminal; a detector operation setting process of selecting and driving, by the detector, a detection unit including at least one gas detection unit and a vibration detection unit of at least one gas detection unit and the vibration detection unit of a detection unit; a detector operation process of measuring, by the detector, a gas for at least one type leaked to the inside and the outside of the detection target device, and a vibration through the set detection unit, determining whether there is an alarm situation according to a gas concentration value and an intensity of the vibration, which are measured, generating and transmitting, to a detector management unit, gas state monitoring information including gas measurement data for the measured gas concentration value and vibration measurement data for the vibration intensity value when there is no alarm situation, and generating an alarm, and then transmitting, to the detector management unit, alarm notification information when there is the alarm situation; and a network monitoring process of receiving and analyzing, by the detector management unit, the gas state monitoring information, generating and storing the analyzed analysis information, providing, to the user mobile terminal, the corresponding analysis information when requesting the analysis information for the detector registered thereby from the user mobile terminal, and transmitting the alarm notification information to the user mobile terminal when receiving the alarm notification information.

The detector registering process may include a paring step of performing, by the user mobile terminal, pairing by searching wireless network identification information of the detector, a registration information generating step of generating, by the user mobile terminal, detector registration information including the detector identification information of the detector and the user mobile terminal identification information when the pairing is completed, and a registration step of transmitting and registering, by the user mobile terminal, the detector registration information to and in the detector management unit.

The detector operation setting process may include a detection type information monitoring step of monitoring, by the detector, a sensor connection unit and examining whether detection type information is input from a detection unit connected to the sensor connection unit, a detection type classifying step of determining, by the detector, whether a detection type is a gas or a vibration when the detection type information is input, and classifying the type of classified gas, and an operation setting step of performing operation setting corresponding to at least one gas and vibration included when the detection type classified in the detection type classifying step includes at least one gas and vibration.

The detector operation process may include a data acquiring step of acquiring, by a detector control unit, gas measurement data measured for at least one gas type through a gas detection unit of a detection unit and acquiring acceleration sampling data through an earthquake detection unit, an information providing step of generating gas state monitoring information including the measured gas measurement data and the acceleration sampling data, and transmitting the generated gas state monitoring information to a detector management unit through a communication unit, a gas leakage determining step of determining, by the detector controller, whether a gas concentration value (measurement value) for the acquired gas measurement data exceeds a reference value, an earthquake occurrence determining step of calculating, by the detector control unit, acceleration values for x, y and z axes from the acquired acceleration sampling data, and determining whether there is an acceleration value which exceeds the reference value among the calculated acceleration values for each axis, and an alarm generating step of determining that the gas is generated when at least one of the gas leakage and the earthquake occurrence is continued for a predetermined time or more, autonomously giving the alarm, and transmitting alarm notification information to the detector manager through the communication unit.

According to an exemplary embodiment of the present disclosure, there is an effect that a detector is configured in the form of an Internet of Things (IoT) device, and as a result, it is easy to install the IoT device.

According to an exemplary embodiment of the present disclosure, there is an effect that since a plurality of gases and earthquakes can be simultaneously detected, efficiency can be enhanced and a production price can be minimized.

According to an exemplary embodiment of the present disclosure, there is an effect that a detection means type connected through a sensor connection unit can be diversified, and an operation is set by automatically recognizing the connected detection means to provide convenience to a user.

According to an exemplary embodiment of the present disclosure, there is an effect that since power supplied to a peripheral detection target device can be interrupted based on a criterion when at least one of gas detection and earthquake occurrence occurs, secondary damage due to the earthquake, etc., can be minimized.

According to an exemplary embodiment of the present disclosure, there is an effect that the user can easily register the detector in a remote management center by using a user mobile terminal thereof to provide registration convenience to the user and easily set remote monitoring.

According to an exemplary embodiment of the present disclosure, there is an effect that measurement information is provided to the user mobile terminal by pairing the user mobile terminal and the detector to allow the user to check whether the gas is leaked and the earthquake occurs anytime everywhere to provide convenience to the user and allow the user to quickly cope with the gas leakage and the occurrence of the earthquake.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, configurations and operations of a gas and earthquake detector and a gas and earthquake remote monitoring system using the same will be described, and the operation of the detector and a gas and earthquake remote monitoring method according to the present disclosure will be described with reference to the accompanying drawings.

Figure 1:
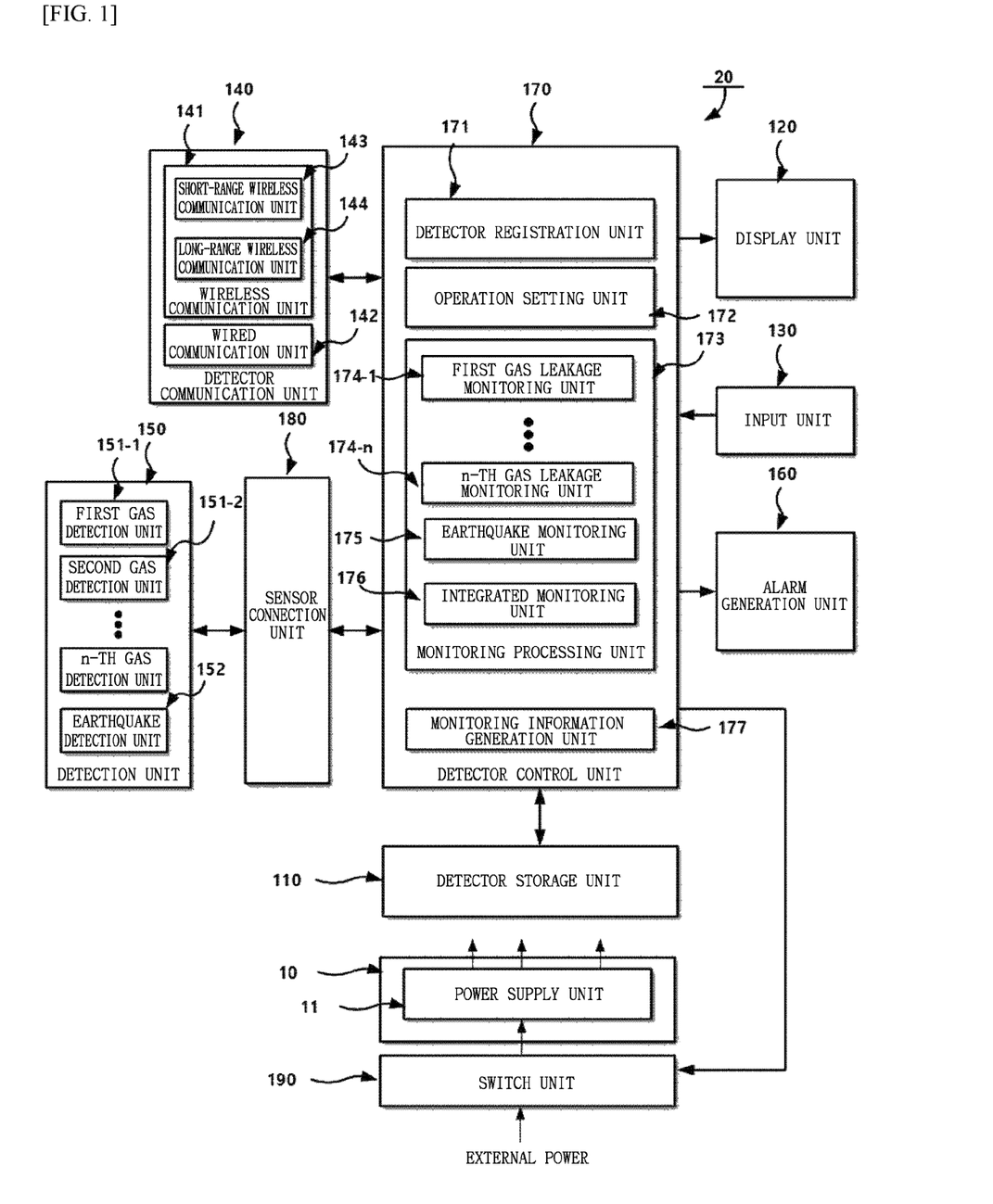
FIG. 1 is a diagram illustrating a configuration of a gas and earthquake detector according to the present disclosure.

FIG. 1 is a diagram illustrating a configuration of a gas and earthquake detector according to the present disclosure.

Referring to FIG. 1, a detector 20 detecting a gas and an earthquake according to the present disclosure includes a detector storage unit 110, a display unit 120, an input unit 130, a detector communication unit 140, a detection unit 150, and an alarm generation unit 160, and in some exemplary embodiments, may further include a sensor connection unit 180 and a switch unit 190.

The detector storage unit 110 includes a program area storing a control program for controlling an overall operation of the detector 20 according to the present disclosure, a temporary area temporarily storing data generated while executing the control program, and a data area semi-persistently storing data required for executing the control program and data generated while executing the control program. The detector storage unit 110 stores detector identification information according to the present disclosure.

The display unit 120 which displays operation state information of the detector 20 and information for detector operation setting according to the present disclosure may adopt a text liquid crystal display (LCD) or a graphic LCD.

The input unit 130 is a button input device including a plurality of buttons for setting an on or off operation according to the present disclosure, and may include a touch pad which is integrally configured in a screen of the display unit 120 and outputs a position signal for a touched position, etc.

The detector communication unit 140 includes a wireless communication unit 141 and a wired communication unit 142.

The wireless communication unit 141 includes a short-range wireless communication unit 143 and/or a long-range wireless communication unit 144.

The short-range wireless communication unit 143 is directly connected to peripheral short-range wireless devices by applying a short-range wireless communication scheme such as Bluetooth, etc., to perform data communication.

The long-range wireless communication unit 144 accesses a wired/wireless data communication network 1 of FIG. 2 to be described below to perform data communication with long-range devices accessing the wired/wireless data communication network 1. The long-range wireless communication unit 144 may be WiFi, Zigbee, etc., and may adopt a short-range wireless communication means.

The wired communication unit 142 is wiredly connected to the wired/wireless data communication network 1 to perform the data communication with other devices connected to the wired/wireless data communication network 1.

The detection unit 150 includes n gas detection units 151 and one earthquake detection unit 152.

The n gas detection units 151 detect different types of gases. As an example, the gas may become carbon monoxide, a liquid natural gas (LNG), etc.

The earthquake detection unit 152 which detects vibration may become a gyro sensor, an acceleration sensor, etc., and outputs acceleration measurement data for each axis, which is an acceleration value for each of X and Y and Z axes according to the vibration, a motion, etc., of the detector 20 to the detector control unit 170.

The each gas detection unit 151 and the earthquake detection unit 152 may be individually configured and configured as one module.

The alarm generation unit 160 is controlled by the detector control unit 170 to generate the alarm and a type of alarm may become various types including siren, voice guidance, light (red) flashing, etc.

The sensor connection unit 180 is applied when the detection unit 150 may be configured to be attached to and detached from the sensor connection unit 180, and includes a connection means to the detection unit 150 may be connected as one module or each detection means may be individually connected, and performs a signal interface between the detection unit 150 and the detector control unit 170 connected to the connection means.

In this case, when the gas detection unit 151 and the earthquake detection unit 152 receive a monitoring signal from the detector control unit 170 through the sensor connection unit 180, the gas detection unit 151 and the earthquake detection unit 152 output detection type information for a detection type detected by each of the gas detection unit 151 and the earthquake detection unit 152 to the detector control unit 170.

When the sensor connection unit 180 is connected to the detection unit 150, the sensor connection unit 180 may be configured to output a connection notification signal for generating an operation setting event to the detector control unit 170.

The switch unit 190 is connected between a power supply unit 11 of a detection target to be detected by the detection means according to the present disclosure, i.e., a device 10 (hereinafter, referred to as "detection target device") generating the gas and an external power supply, and is controlled by the detector control unit 170 to supply or interrupt an external power to or from the power supply unit 11.

The detector control unit 170 includes a detector registration unit 171, an operation setting unit 172, a monitoring processing unit 173, and a monitoring information generation unit 177 to control an overall operation of the detector 20 according to the present disclosure.

Figure 2:
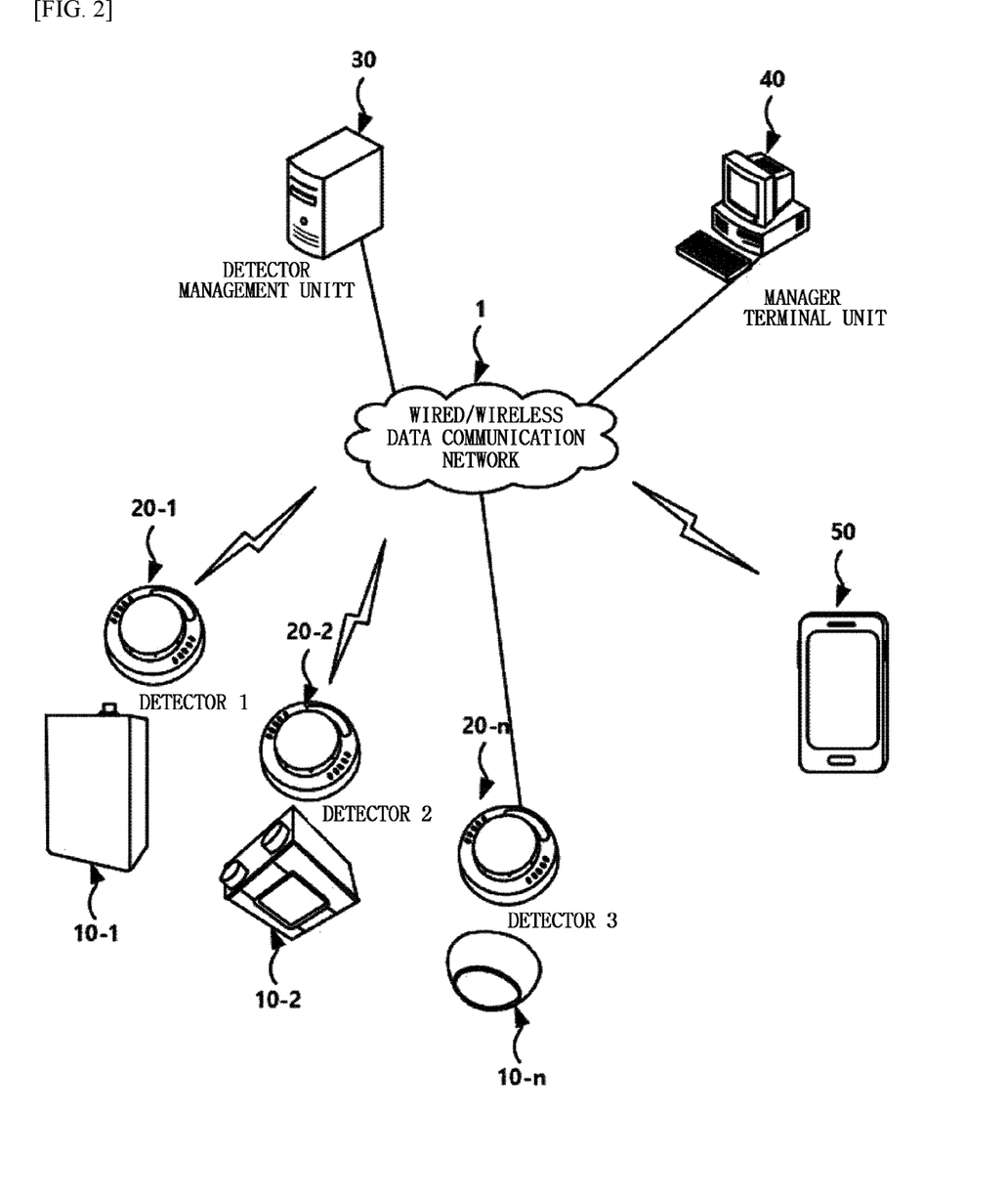
FIG. 2 is a diagram illustrating a configuration of a gas and earthquake remote monitoring system including a gas and earthquake detector according to the present disclosure.

Specifically, the detector registration unit 171 performs pairing through with the user mobile terminal of the user who uses the detector 20 through the input unit 130 and the display unit 120 through the wireless communication unit 141 of the detector communication unit 140, and then transmits registration request information including the detector identification information thereof to the user mobile terminal to register the detector 20 in a detector management unit 30 to be described below in FIG. 2.

The detector registration unit 171 may be configured to acquire user mobile terminal identification information of the user mobile terminal from the user mobile terminal during the pairing and register the acquired user mobile terminal identification information in the detector storage unit 110. In this case, when the alarm generation event is generated afterwards, gas state monitoring information and alarm notification information may be directly transmitted to the user mobile terminal corresponding to the user mobile terminal identification information.

The operation setting unit 172 sets a gas and an earthquake to be detected through the detection unit 150 automatically through the display unit 120 and the input unit 130 or through the sensor connection unit 180.

That is, the operation setting unit 172 sets to operate which gas detection unit among multiple gas detection units 151 by selecting which gas is to be detected and whether to operate the earthquake detection unit 152 simultaneously with gas detection.

The operation setting unit 172 may be configured to set whether to perform power interruption of the monitoring target device 10 according to each detection means or whether to perform the power interruption by integrally reflecting the detection information of the detection means by the user.

The monitoring processing unit 173 includes gas leakage monitoring units 174 capable of processing gas measurement data for each gas of the detection unit 150, and an earthquake monitoring unit 175 and an integrated monitoring unit 176 for detecting the earthquake.

Each gas leakage monitoring unit 174 receives gas measurement data from the corresponding gas detection unit 151 and examines whether a gas concentration for the gas measurement data exceeds a threshold preset for the corresponding gas, and outputs a gas leakage signal according to whether the gas concentration exceeds the threshold to the integrated monitoring unit 176 or outputs a switch control signal to the switch unit 190.

The earthquake monitoring unit 175 receives acceleration sampling data output from the earthquake detection unit 152, and compares an acceleration value for each axis and a threshold for each axis and determines whether the acceleration value for each axis exceeds the threshold for each axis to determine whether the earthquake occurs, and outputs an earthquake occurrence signal to the integrated monitoring unit 176 or outputs the switch control signal to the switch unit 190.

The integrated monitoring unit 176 receives the gas leakage signal and the earthquake occurrence signal from each gas leakage monitoring unit 174 and the earthquake monitoring unit 175, and integrally reflects the gas leakage signal and the earthquake occurrence signal, and outputs the switch control signal to the switch unit 190.

The monitoring information generation unit 177 generates gas state monitoring information including the gas measurement data and the acceleration sampling data input from the detection unit 150, and provides the generated gas state monitoring information to the detector management unit 30 through the detector communication unit 140.

The monitoring information generation unit 177 transmits the alarm notification information to the detector management unit 30 when an error is detected by any one of the gas leakage monitoring unit 174, the earthquake monitoring unit 175, and the integrated monitoring unit 176.

Meanwhile, the monitoring information generation unit 177 may be configured to transmit the gas state monitoring information and the alarm notification information to the user mobile terminal of the user mobile terminal identification information acquired during pairing or registering the detector according to another embodiment.

FIG. 2 is a diagram illustrating a configuration of a gas and earthquake remote monitoring system including a gas and earthquake detector according to the present disclosure.

The gas and earthquake remote monitoring system including the gas and earthquake detector 20 according to an exemplary embodiment of the present disclosure includes multiple detectors 20 and a detector management unit 30, and in some exemplary embodiments, may further include a manager terminal unit 40 and a user mobile terminal 50.

The detector 20, the detector management unit 30, the manager terminal unit 40, and the user mobile terminal 50 are interconnected through any one of a wired scheme and a wireless scheme through the wired/wireless data communication network 1 to perform the data communication.

The wired/wireless data communication network 1 may be a data communication network in which an Internet network including an access point (AP) such as WiFi, etc., a mobile communication network including a 3 generation (3G), 4G, 5G, etc., a WiBro network, etc., are coupled.

The detector 20 is configured inside or outside the detection target device 10 such as a boiler 10-1, a ventilation system 10-2, an alarm device 10-n, etc., and monitors whether the gas is leaked from the detection target device 10 and the vibration is generated in the detection target device 10 and a periphery thereof, and transmits the gas state monitoring information including the monitored gas measurement data and acceleration sampling data to at least one of the detector management unit 30 and the user mobile terminal 50.

The user mobile terminal unit 50 may register the detector in the detector management unit 30 according to the present disclosure, and have a detector application which may receive information from at least one of the detector 20 and the detector management unit 30, and display the received information, which is installed therein.

The user mobile terminal unit 50 performs pairing with the corresponding detector 20 when registering the detector, acquires detector identification information of the corresponding detector 20 when performing the pairing, and transmits and registers detector registration information including the acquired detector identification information and user mobile terminal identification information thereof to and in the detector management unit 30.

The detector management unit 30 receives gas state monitoring information from detectors 20 which are IoT devices, and stores and manages the received gas state monitoring information for each detector, and analyzes the stored gas state monitoring information to autonomously monitor whether the corresponding detector 20 is abnormal, and monitors whether the alarm notification information is received from the detectors 20 to monitor whether the corresponding detector 20 is abnormal.

When abnormality occurs in a random detector 20, the detector management unit 30 transmits the alarm notification information to at least one of the manager terminal unit 40 and the user mobile terminal 50.

The manager terminal unit 40 may be a terminal unit of a system manager or a terminal unit of an associated organization related to the gas leakage and the earthquake. The associated organization may be a fire station, a police station, etc.

Figure 3:
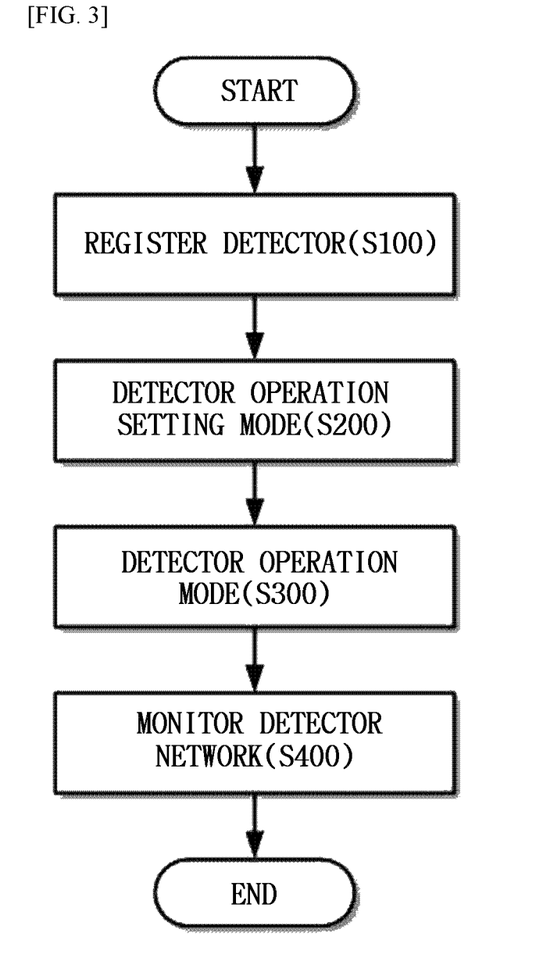
FIG. 3 is a flowchart showing a gas and earthquake remote monitoring method using a gas and earthquake detector according to the present disclosure.

FIG. 3 is a flowchart showing a gas and earthquake remote monitoring method using a gas and earthquake detector according to the present disclosure.

Referring to FIG. 3, a user who installs a detector 20 of the present disclosure or installs a detection target device 10 in which the detector 20 is configured should register the detector 20 in a detector management unit 30 by using a user mobile terminal 50 thereof (S100).

When registration is completed, the detector 20 sets a detector operation by performing a detector operation setting mode (S200).

When the detector operation is set, the detector 20 generates gas state monitoring information including gas measurement data measured through a detection unit 150 and acceleration sampling data and starts transmitting the generated gas state monitoring information to the detector management unit 30, in some exemplary embodiments, transmits the gas state monitoring information to the connected user mobile terminal 50, and perform a detector operation mode to transmit alarm notification information to at least one of the detector management unit 30 and the user mobile terminal 50 when gas leakage and earthquake are detected (S300).

The detector management unit 30 periodically collects the gas state monitoring information through a wired/wireless data communication network 1 for the registered detector 20, and monitors whether the alarm notification information is received by the collected gas state monitoring information or from the detector 20 to monitor whether the gas leakage and the earthquake occur (S400).

Figure 4:
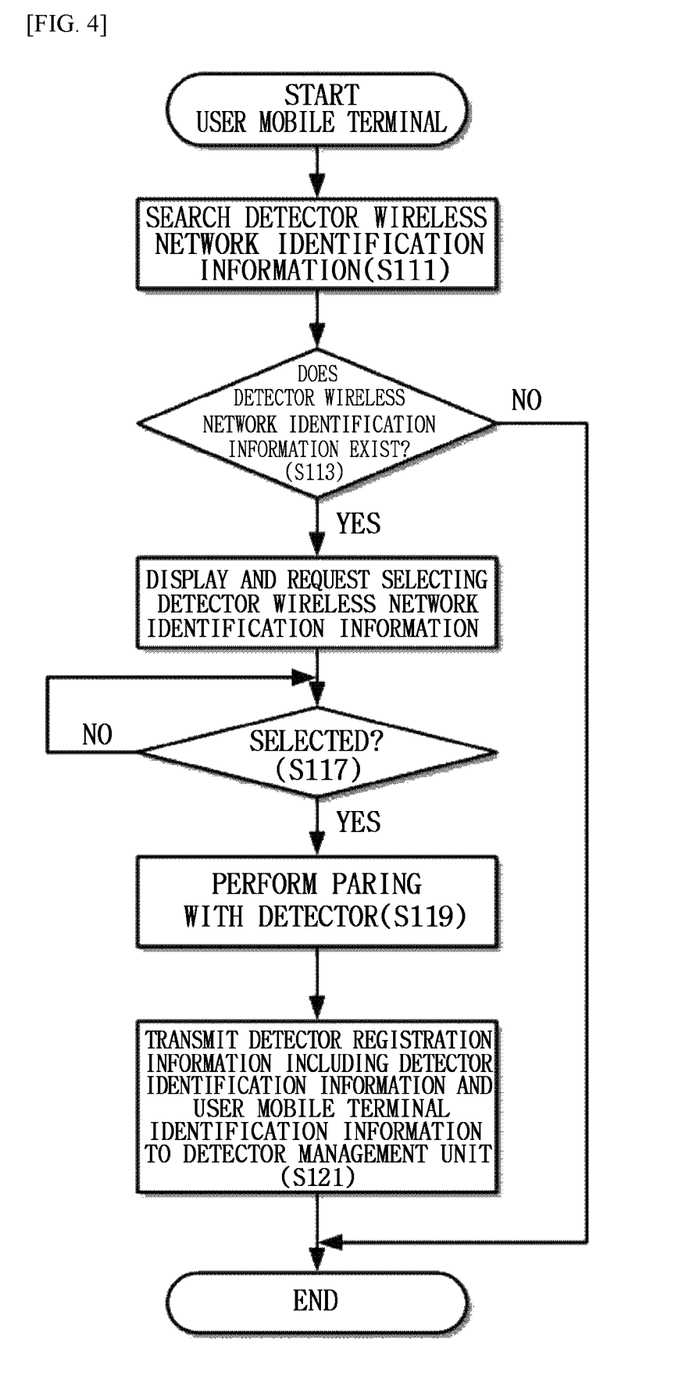
FIG. 4 is a flowchart showing a gas and earthquake detector registering method in a user mobile terminal in a gas and earthquake remote monitoring method using a gas and earthquake detector according to the present disclosure.

FIG. 4 is a flowchart showing a gas and earthquake detector registering method in a user mobile terminal in a gas and earthquake remote monitoring method using a gas and earthquake detector according to the present disclosure. Referring to FIG. 4, a registration method of the detector 20 will be described in more detail.

The user mobile terminal 50 searches detector wireless network identification information (S111) and examines whether there is the detector wireless network identification information (S113). The detector wireless network identification information includes unique identification information of only the detector.

When there is the detector wireless network identification information, the user mobile terminal 50 requests selecting detector wireless network identification information to be registered (S115) and examines whether the detector wireless network identification information is selected (S117).

When the detector wireless network identification information is selected, pairing with the corresponding detector 20 is performed (S119), detector identification information is acquired from the detector 20 connected while performing the pairing, and detector registration information including the acquired detector identification information and user mobile terminal identification information thereof is generated, and then, transmitted to the detector management unit 30 to request registration (S121).

Then, the detector management unit 30 will register the corresponding detector 20 by storing the detector identification information and the user mobile terminal identification information of the detector registration information.

Figure 5:
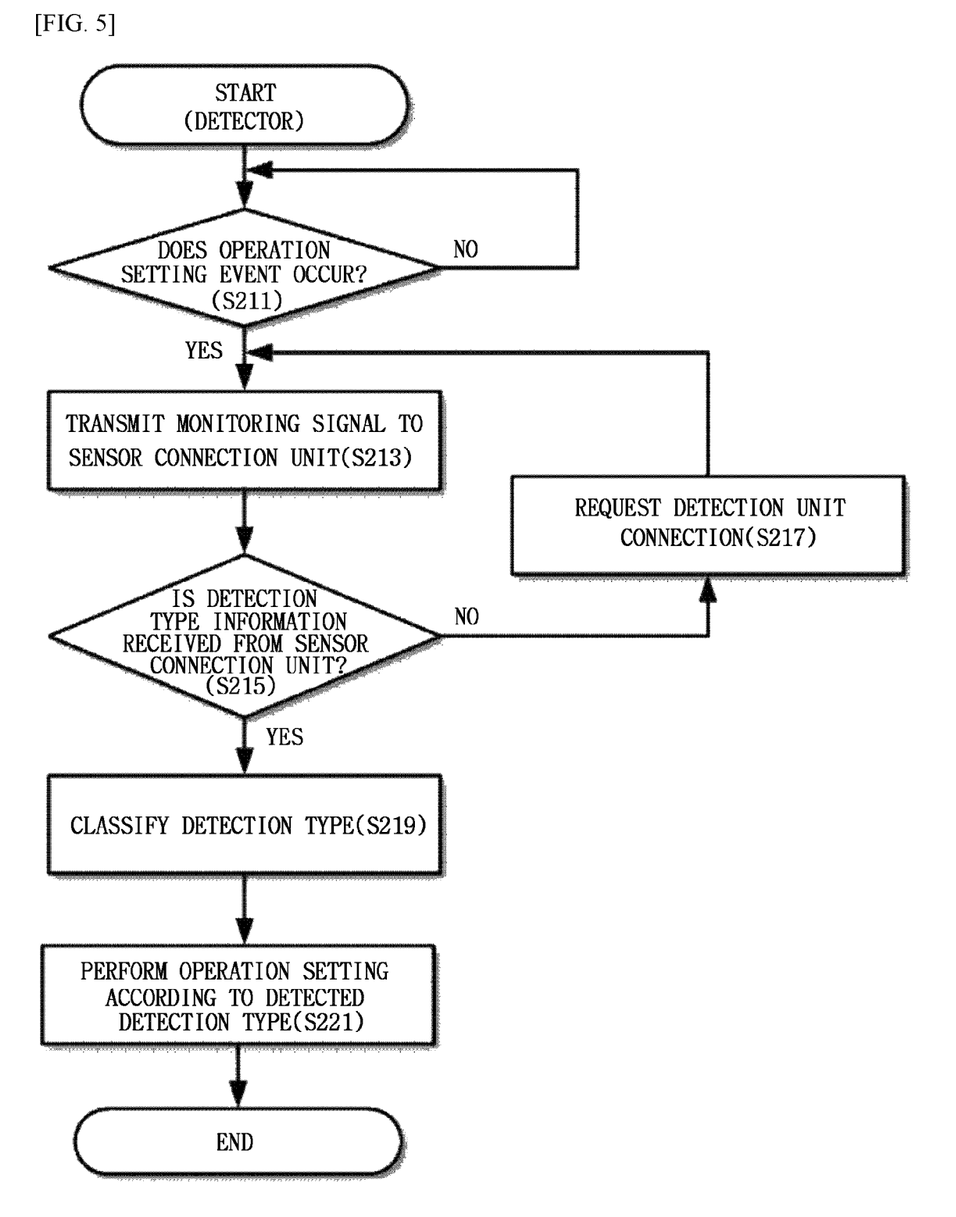
FIG. 5 is a flowchart showing an operation setting method in a gas and earthquake detector in a gas and earthquake remote monitoring method using the gas and earthquake detector according to the present disclosure.

FIG. 5 is a flowchart showing an operation setting method in a gas and earthquake detector in a gas and earthquake remote monitoring method using a gas and earthquake detector according to an exemplary embodiment of the present disclosure.

Referring to FIG. 5, the detector control unit 170 of the detector 20 monitors whether an operation setting event occurs by the display unit 120 and the input unit 130 or the sensor connection unit 180 (S211).

When the operation setting event occurs, the detector control unit 170 transmits a monitoring signal to the sensor connection unit 180 (S213), and examines whether detection type information for each detection means (the gas detection unit 151 and the earthquake detection unit 152) is received from the sensor connection unit 180 in response to the monitoring signal (S215).

When the detection type information is not received, the detector control unit 170 displays a message for requesting connecting the detection unit 150 through the display unit 120 (S217) and retransmits the monitoring signal.

When the detection type information is received, the detector control unit 170 classifies a detection type (S219) and performs detector operation setting such as driving monitoring units 174 and 175 corresponding to the detection type (S221).

Figure 6:
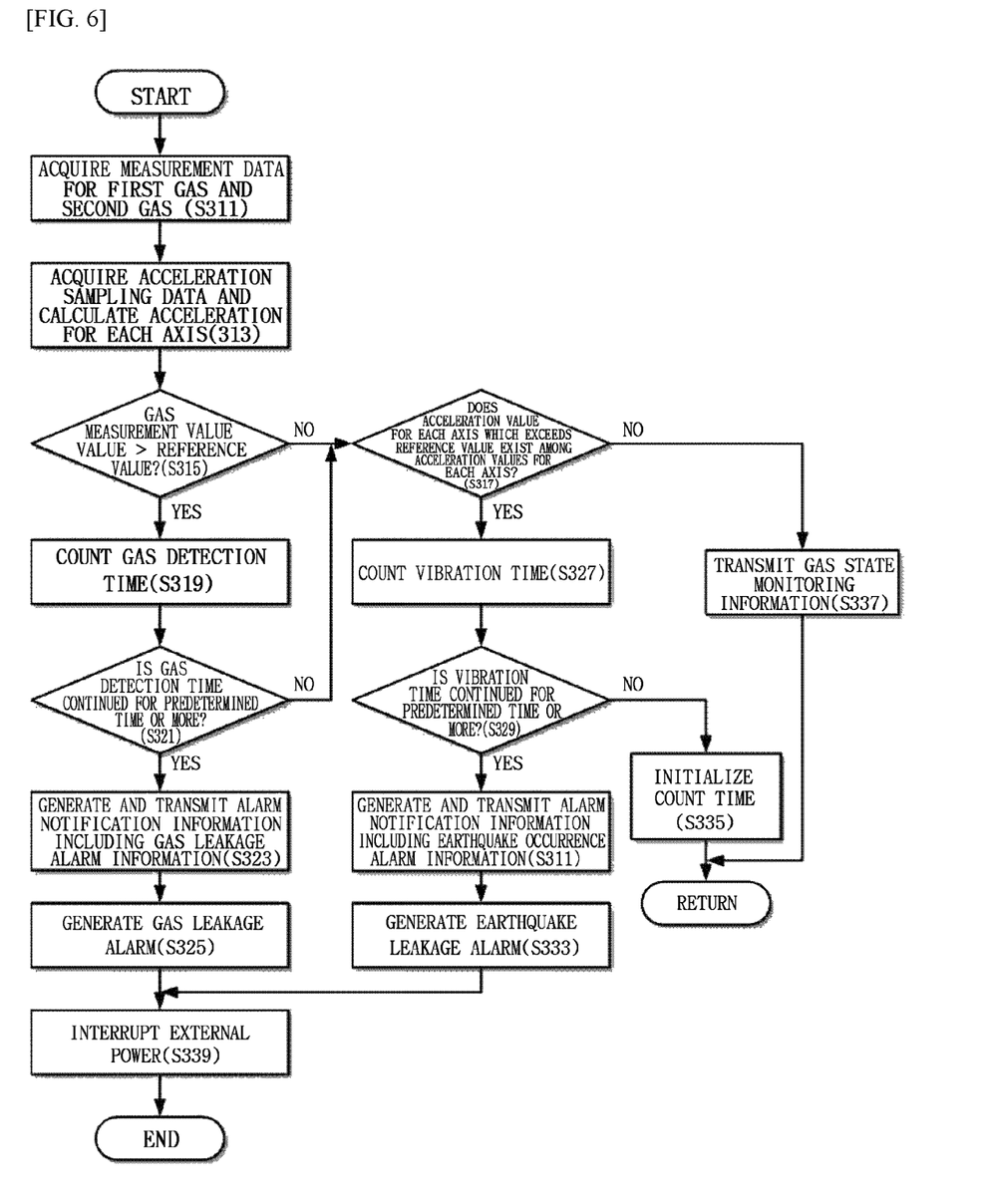
FIG. 6 is a flowchart showing a gas leakage and earthquake alarming method in a gas and earthquake detector in a gas and earthquake remote monitoring method using the gas and earthquake detector according to the present disclosure.

FIG. 6 is a flowchart showing a gas leakage and earthquake alarming method in a gas and earthquake detector in a gas and earthquake remote monitoring method using the gas and earthquake detector according to the present disclosure.

Referring to FIG. 6, the detector control unit 170 acquires gas measurement data for a first gas, a second gas, etc., through the gas detection unit 151 (S311).

The detector control unit 170 acquires the acceleration sampling data through the earthquake detection unit 152 and calculates an acceleration for each axis from the acquired acceleration sampling data (S313).

When the gas measurement data and the acceleration for each axis are calculated, the detector control unit 170 examines a gas measurement value according to a gas type, i.e., a gas concentration value exceeds a threshold (reference value) predefined for the corresponding gas type (S315), and examines whether the acceleration value for each axis exceeds a threshold (reference value) of a corresponding axis (S317).

When either the gas measurement value and the acceleration value do not exceed the reference values, the detector control unit 170 generates the gas state monitoring information including the gas measurement data and the acceleration sampling data, and transmits the generated gas state monitoring information to the detector management unit 30 (S337).

On the contrary, when the gas measurement value exceeds the threshold, the detector control unit 170 counts a gas detection time (S319), monitors whether the gas detection time is continued for a predetermined time or more (S321) and when there is an acceleration value for each axis, which exceeds the threshold among the acceleration values for each axis, the detector control unit 170 starts counting a vibration time (S327) and monitors whether the vibration is continued for a predetermined time (S329).

When the gas detection time is continued for a predetermined time or more, the detector control unit 170 generates the alarm notification information and transmits the generated alarm notification information to at least one of the detector management unit 30 and the user mobile terminal 50 (S323), and autonomously generates the alarm through the alarm generation unit 160 (S325).

When the vibration time is continued for a predetermined time or more, the detector control unit 170 generates an alarm notification information including earthquake occurrence elapse information and transmits the generated alarm notification information to at least one of the detector management unit 30 and the user mobile terminal 50 (S331), and autonomously controls the alarm generation unit 160 and generates the alarm (S333).

After the alarm is generated, the detector control unit 170 controls the switch unit 190 interrupts external power to the detector target device 10 (S339).

On the contrary, when the gas detection time is not continued for the predetermined time or more or the vibration time is not continued for the predetermined time or more, the counted time is initialized (S335) and the process returns to repeatedly perform the above-described process.

Meanwhile, it will be able to be easily appreciated by those skilled in the art that the present disclosure is not limited only to the above-described preferred embodiment, but can be implemented by various modifications, changes, substitutions, or additions within the scope without departing from the spirit of the present disclosure. If the implementation by the modifications, changes, substitutions, or additions belongs to the category of the appended claims, it should be regarded that the technical spirit also pertains to the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A gas and earthquake detector comprising:
    a detector communication unit connected to a wired/wireless data communication network by at least one of wired and wireless schemes to perform data communication with a detector management unit which is a gas leakage and earthquake monitoring system at a remote place, which is connected to the wired/wireless data communication network;
    a detection unit including at least one gas detection unit, which detects gas concentrations for different types of gases exposed to air of surrounding area of the gas detection unit, and an earthquake detection unit detecting a vibration and outputting a vibration intensity value corresponding to an intensity of the detected vibration;
    an alarm generation unit generating an alarm; and
    a detector control unit setting an operation of at least one of the at least one gas detection unit and the earthquake detection unit of the detection unit, determining (A) whether gas is leaked by receiving the gas concentrations by at least one of the at least one gas detection unit and B) whether an earthquake occurs by receiving the vibration intensity value by the earthquake detection unit, transmitting gas state monitoring information including the gas concentrations, when the gas concentrations are not measured, and the vibration intensity value, when the earthquake does not occur, to the detector management unit through the detector communication unit, and transmitting accident occurrence prevention notification information to the detector management unit through the detector communication unit when any one of the gas leakage and the earthquake occurrence occurs, wherein
        the detector communication unit includes a wireless communication unit performing wireless data communication with the wired/wireless data communication network,
        the detector control unit includes a detector registration unit wirelessly connected to a user mobile terminal through the wireless communication unit and providing detector identification information to the user mobile terminal and registering the detector identification information in the detector management unit through the user mobile terminal,
        the user mobile terminal performs pairing by searching wireless network identification information of the detector, generates detector registration information including the detector identification information of the detector and user mobile terminal identification information when the pairing is completed, and transmits to and registers in the detector management unit, the detector registration information, and
        the detector management unit transmits alarm notification information to the user mobile terminal when the alarm notification information is received.

2. The gas and earthquake detector of claim 1,
    wherein the wireless communication unit includes a long-range wireless communication unit wirelessly connected to the wired/wireless data communication network and a short-range wireless communication unit performing direct short-range wireless communication with another device in a short range; and the detector communication unit further includes a wired communication unit wiredly connected to the wired/wireless data communication network to perform wired data communication with the wired/wireless data communication network.

3. A method for controlling a gas and earthquake detector, the method comprising:
- a data acquiring process of acquiring, by a detector control unit, gas measurement data measured for at least one gas type through a gas detection unit of a detection unit and acquiring acceleration sampling data through an earthquake detection unit;
- an information providing process of generating gas state monitoring information including the measured gas measurement data and the acceleration sampling data, and transmitting the generated gas state monitoring information to a detector management unit through a communication unit;
- a gas leakage determining process of determining, by the detector control unit, whether a gas concentration value (measurement value) for the acquired gas measurement data exceeds a preset gas concentration reference value;
- an earthquake occurrence determining process of calculating, by the detector control unit, acceleration values for x, y and z axes from the acquired acceleration sampling data, and determining whether there is an acceleration value which exceeds a preset acceleration reference value among the calculated acceleration values for each axis;
- an alarm generating process of determining that a gas leakage is generated when at least one of (I) the time when the gas concentration value exceeds the preset gas concentration reference value and (II) the time when the calculated acceleration values for each axis exceed the preset acceleration reference value for each axis is continued for a predetermined time or more, autonomously giving an alarm, and transmitting alarm notification information to the detector manager through the communication unit, the detector manager causing the alarm notification information to be transmitted to a paired user mobile terminal when the alarm notification information is received; and
- a detector registering process of transmitting, by the detector control unit, detector registration information including detector identification information, prestored through the paired user mobile terminal, to the user mobile terminal so as to transmit the detector registration information to the detector management unit, the detector registering process further including:
- a paring step of performing, by the user mobile terminal, pairing by searching wireless network identification information of the detector,
- a registration information generating step of generating, by the user mobile terminal, the detector registration information including the detector identification information of the detector and user mobile terminal identification information when the pairing is completed, and
- a registration step of transmitting and registering, by the user mobile terminal, the detector registration information to and in the detector management unit.

4. The method of claim 3, further comprising:
an operation setting process of performing, by the detector control unit, operation setting according to detection type information input from a detection means of the detection unit through a sensor connection unit.

5. The method of claim 4, wherein the detection type information is at least one of carbon monoxide, liquid natural gas, and an earthquake.

6. A gas and earthquake remote monitoring system using a gas and earthquake detector, comprising:
- a detector provided on a detection target device and configured to measure a gas concentration leaked from the detection target device, and a vibration intensity occurring in the detection target device, and determine (a) whether there is an alarm situation according to a gas concentration value corresponding to the measured gas concentration exceeds a preset gas concentration reference value and (b) a vibration intensity value corresponding to the vibration intensity exceeds a preset vibration intensity, wherein when the gas concentration value exceeds the reference value of the preset gas concentration or the vibration intensity value does not exceed the reference value of the preset vibration intensity, the detector determine that it is not the alarm situation, and generates and transmits gas state monitoring information including gas measurement data for the gas concentration value and vibration measurement data for the vibration intensity value, and conversely, the detector generates an alarm, and then transmits alarm notification information when there is the alarm situation;
- a user mobile terminal unit receiving detector identification information of the detector from the detector, and transmitting detector registration information including the detector identification information and user mobile terminal identification information thereof, and requesting registration, and alarming that abnormality occurs in at least one of the gas leakage from the detection target device and the earthquake occurrence around the detection target device by generating the alarm when receiving the alarm notification information, to a user; and
- a detection management unit receiving the detector registration information from the user mobile terminal unit through a wired/wireless data communication network, and storing the detector identification information and the user mobile terminal identification information of a user who uses the detector, and registering the detector, receiving the gas state monitoring information from the detector through the wired/wireless data communication network and analyzing the received gas state monitoring information, and generating, and then, storing and managing analysis information, receiving the alarm notification information and notifying the received alarm notification information to a corresponding organization, and transmitting the alarm notification information to the user mobile terminal unit based on the user mobile terminal identification information.

7. The gas and earthquake remote monitoring system of claim 6, wherein the detector includes
- a detector communication unit connected to the wired/wireless data communication network by at least one of wired and wireless schemes to perform data communication with a detector management unit which is a gas leakage and earthquake monitoring system at a remote place, which is connected to the wired/wireless data communication network,
- a detection unit including at least one gas detection unit which detects gas concentrations for different types of gases exposed to the air around the gas detection unit and an earthquake detection unit detecting a vibration and outputting a vibration intensity value corresponding to an intensity of the detected vibration;

an alarm generation unit generating an alarm, and a detector control unit setting an operation of at least one of at least one gas detection unit and the earthquake detection unit of the detection unit, determining whether gas is leaked and an earthquake occurs by receiving the gas concentration and the vibration intensity value by the set at least one of the at least one gas detection unit and the earthquake detection unit, transmitting gas state monitoring information including the gas concentration when the gas is not leaked and the vibration intensity value when the earthquake does not occur, to the detector management unit through the detector communication unit, and transmitting accident occurrence prevention notification information to the detector management unit through the detector communication unit when any one of the gas leakage and the earthquake occurrence occurs.

8. The gas and earthquake remote monitoring system of claim 7, wherein the detector further includes a detector storage unit storing detector identification information, and wherein the detector control unit includes a detector registration unit wirelessly connected to a user mobile terminal through the wireless communication unit and providing the detector identification information to the user mobile terminal and registering the detector identification information in the detector management unit through the user mobile terminal.

9. A gas and earthquake remote monitoring method using a gas and earthquake detector, comprising:

a detector registering process of receiving, by a user mobile terminal unit, from a detector, detector identification information of the detector, and transmitting detector registration information including the detector identification information and user mobile terminal identification information thereof to a detector management unit to register the detector and a user mobile terminal;

a detector operation setting process of selecting and driving, by the detector, a detection unit including at least one gas detection unit and a vibration detection unit among one or more gas detection units and the vibration detection unit of the detection unit;

a detector operation process of measuring, by the detector provided on a detection target device and configured to (I) measure a gas concentration leaked from the detection target device, and a vibration intensity occurring in the detection target device, and (II) determine whether there is an alarm situation according to a gas concentration value corresponding to the measured gas concentration that exceeds a preset gas concentration reference value and whether a vibration intensity value corresponding to the vibration intensity exceeds a preset vibration intensity, wherein when the gas concentration value exceeds the reference value of the preset gas concentration or the vibration intensity value does not exceed the reference value of the preset vibration intensity, the detector determines that it is not the alarm situation, and generates and transmits gas state monitoring information including gas measurement data for the gas concentration value and vibration measurement data for the vibration intensity value, and, conversely, the detector generates an alarm, and then transmits alarm notification information when there is the alarm situation; and a network monitoring process of receiving and analyzing, by the detector management unit, the gas state monitoring information, generating and storing the analyzed analysis information, providing, to the user mobile terminal, the corresponding analysis information when requesting the analyzed analysis information for the detector registered thereby from the user mobile terminal, and transmitting the alarm notification information to the user mobile terminal when receiving the alarm notification information, the detector registering process further including a paring step of performing, by the user mobile terminal, pairing by searching wireless network identification information of the detector, a registration information generating step of generating, by the user mobile terminal, the detector registration information including the detector identification information of the detector and the user mobile terminal identification information when the pairing is completed, and a registration step of transmitting and registering, by the user mobile terminal, the detector registration information to and in the detector management unit.

10. The gas and earthquake remote monitoring method of claim 9, wherein the detector operation setting process includes a detection type information monitoring step of monitoring, by the detector, a sensor connection unit and examining whether detection type information is input from a detection unit connected to the sensor connection unit, a detection type classifying step of determining, by the detector, whether a detection type is a gas or a vibration when the detection type information is input, and classifying the type of classified gas, and an operation setting step of performing operation setting corresponding to at least one gas and vibration included when the detection type classified in the detection type classifying step includes at least one gas and vibration.

11. The gas and earthquake remote monitoring method of claim 9, wherein the detector operation process includes a data acquiring step of acquiring, by a detector control unit, gas measurement data measured for at least one gas type through a gas detection unit of a detection unit and acquiring acceleration sampling data through an earthquake detection unit, an information providing step of generating gas state monitoring information including the measured gas measurement data and the acceleration sampling data, and transmitting the generated gas state monitoring information to a detector management unit through a communication unit, a gas leakage determining step of determining, by the detector control unit, whether a gas concentration value (measurement value) for the acquired gas measurement data exceeds a preset gas concentration reference value, an earthquake occurrence determining step of calculating, by the detector control unit, acceleration values for x, y and z axes from the acquired acceleration sampling data, and determining whether there is a calculated acceleration value which exceeds a preset acceleration reference value for each axis among the calculated acceleration values for each axis, and an alarm generating step of determining that a gas leakage is generated when at least one of (A) the time when the gas concentration value exceeds the preset gas concentration reference value and (B) the time when the calculated acceleration values for each axis exceed the preset acceleration reference value for each axis is continued for a predetermined time or more, autonomously giving the alarm, and transmitting alarm notification information to the detector manager through the communication unit.

* * * * *